Patented Oct. 11, 1938

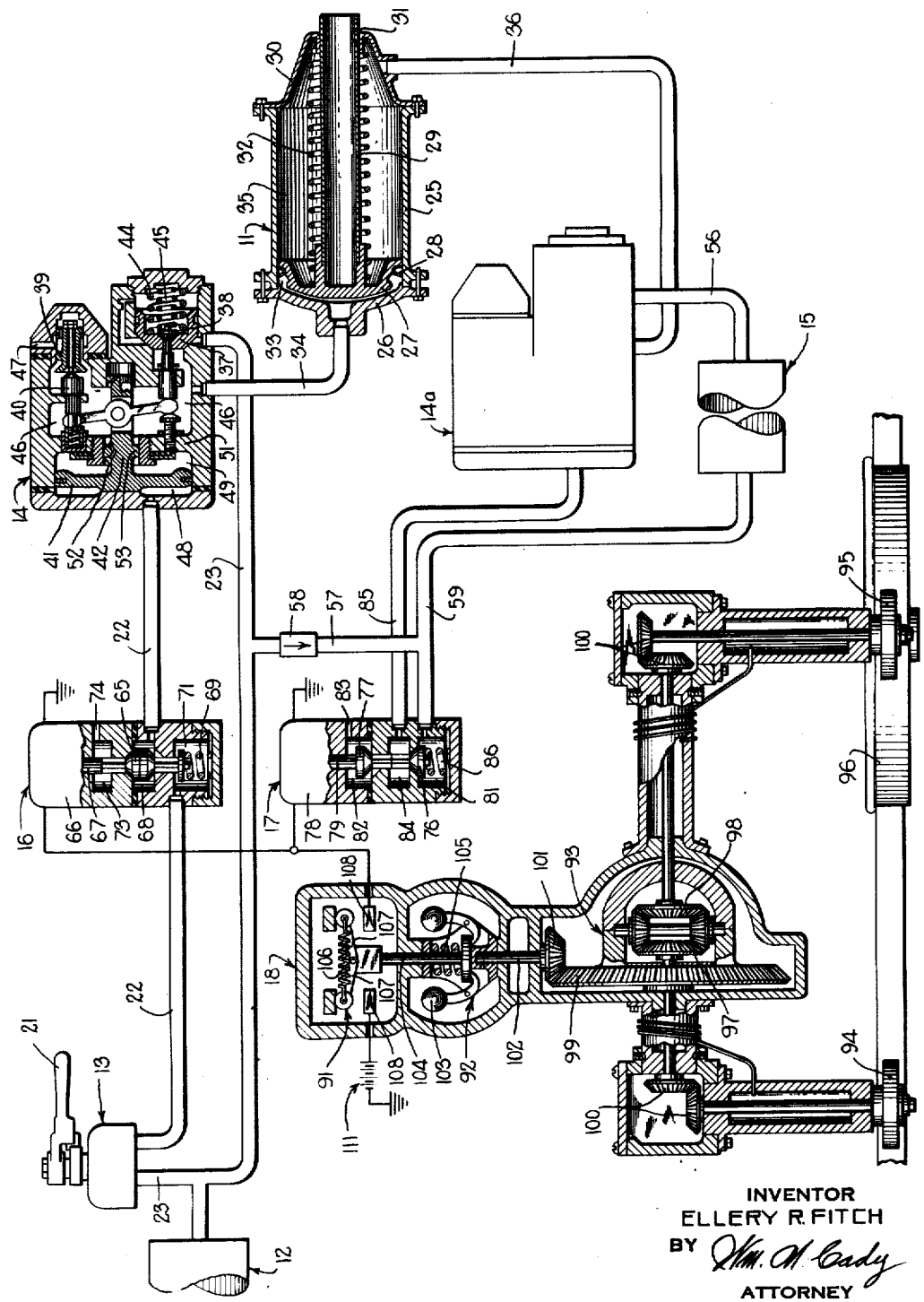

2,132,914

UNITED STATES PATENT OFFICE 2,132,914

BRAKE CONTROL MEANS

Ellery R. Fitch, Irwin, Pa., assignor to The Westinghouse Air Brake Company, Wilmerding, Pa., a corporation of Pennsylvania Application June 29, 1937, Serial No. 150,920

8 Claims. (Cl. 303—21)

This invention relates to brake control means and has particular relation to vehicle brake control means including mechanism for guarding against sliding of the vehicle wheels.

As is well known, when the braking force applying the brakes to vehicle wheels, such as the wheels of a railway car or train, becomes sufficiently great to exceed that permitted by the coefficient of adhesion between the rim of the wheel and the road surface or track rail, the wheel begins to slip, that is, it decelerates rapidly from a rotative speed corresponding to vehicle speed toward a zero speed corresponding to a locked-wheel state. When the vehicle wheel is dragged along the road surface or rail in a rotatively locked state, the wheel is said to slide. The terms "slipping" and "sliding" as applied herein to vehicle wheels thus have distinctly different meanings.

The interval of time over which the vehicle wheel decelerates from a rotative speed corresponding to vehicle speed to zero speed or the locked-wheel state is referred to herein as the "slipping period" or "slipping interval" and varies in length depending upon the rapidity with which the retarding force applying the brakes on the vehicle wheels is relieved when a wheel or wheels begin to slip.

Anti-wheel-sliding mechanism has been previously proposed which causes the pressure in a brake cylinder effecting application of the brakes to be rapidly released to atmosphere upon the initiation of wheel-slipping. It has been found, however, that in many instances due to friction in the brake rigging and sticking of the brake shoes to the wheels, it is necessary to reduce the pressure in the brake cylinder substantially one hundred per cent, that is, almost to atmospheric pressure before the release spring in the brake cylinder is rendered effective to exert enough force to cause the brake shoes to release sufficiently to permit the slipping wheel to cease further slip deceleration and accelerate back to a rotative speed corresponding to vehicle speed.

Thus, as in the case of present day high-speed trains, if the brake cylinder pressure during an application is relatively high, the time interval required to reduce the fluid pressure in the brake cylinder sufficiently to fully release the brakes on a slipping wheel may be so great that in the meanwhile the wheel attains a locked-wheel state and thus slides until the brake cylinder pressure is reduced sufficiently to fully release the brakes and thereby permit the wheel to rotatively accelerate back toward a speed corresponding to the vehicle or rail speed.

It is, therefore, the primary object of my invention to insure the rapid release of the brakes, upon the initiation of slipping of a vehicle wheel, so that the slipping wheel may cease slip deceleration and accelerate back to a rotative speed corresponding to vehicle speed before attaining a locked-wheel state, thereby preventing sliding of the vehicle wheel and the consequent development of objectionable flat spots on the wheel.

More specifically, it is an object of my invention to rapidly equalize the fluid pressures on opposite sides of the brake operating piston in a brake cylinder, upon the initiation of wheel-slipping, so that the brake cylinder piston responds, almost instantly, to effect release of the brakes and thus prevent wheel-sliding.

The above objects, and other objects of my invention which will be made apparent hereinafter, are attained by means of an illustrative embodiment of my invention subsequently to be described and shown in the single figure of the accompanying drawing.

Description of equipment

Referring to the drawing, the essential elements of a fluid pressure brake equipment for applying the brakes to a vehicle wheel are illustratively shown as including a brake cylinder 11, a source of fluid under pressure, such as a main reservoir 12, a manually operative brake valve device 13, and a relay valve device 14 operatively controlled by the brake valve device 13 for supplying fluid under pressure from the main reservoir 12 to and for releasing fluid under pressure from the brake cylinder 11.

According to my invention, the equipment further includes a supply reservoir 15, a relay valve device 14a, identical in construction with the relay valve device 14, for controlling the supply of fluid under pressure from the supply reservoir 15 to the usual non-pressure side of the brake cylinder piston, two magnet valve devices 16 and 17 for controlling the supply and release of fluid under pressure to and from the relay valve devices 14 and 14a, respectively, and a wheel-slip detector 18 for controlling the magnet valve devices 16 and 17.

Considering the parts of the equipment in greater detail, the brake valve device 13 can be of any suitable character and is illustratively shown as comprising an operating handle 21 for operating a rotary valve, not shown, within the casing of the brake valve device and positionable in various operating positions, such as release, service application, emergency application and lap. With the brake valve handle 21 in its normal release position, the rotary valve is correspondingly positioned to establish communication to atmosphere from a pipe 22, leading to the relay valve device 14, and at the same time to lap or close off the supply of fluid under pressure through the brake valve device from the main reservoir 12 by way of a supply pipe 23.

With the operating handle 21 in a service application position, the rotary valve is correspondingly positioned to establish communication through which fluid under pressure is supplied at a service rate from the main reservoir supply pipe 23 to the pipe 22. When a desired degree of pressure has been obtained in the pipe 22, the brake valve handle 21 is shifted to lap position wherein the rotary valve closes the connection from the main reservoir supply pipe 23 to the pipe 22 and holds the pressure established in the pipe 22 at the attained pressure.

With the brake valve handle 21 in emergency position, the rotary valve establishes communication through which fluid under pressure is supplied at an emergency rate from the main reservoir supply pipe 23 to the pipe 22.

It will be understood that instead of the brake valve device 13 just described, a self-lapping type of brake valve device may be employed wherein the degree of pressure established in the pipe 22 corresponds to the degree of displacement of a brake valve handle from its normal release position into an application zone.

The brake cylinder 11 comprises a cylinder or casing 25 which is open at both ends and which has flanges at the opposite ends whereby, through the medium of suitable screws or bolts, pressure heads or end covers 26 and 30 are attached thereto. Contained in the cylinder 25 is a piston 27 which is provided with a suitable sealing ring or disc 28 and which has integrally formed with or attached thereto a hollow stem or sleeve 29 which extends through a suitably conforming opening 31 in the end cover 30. If desired, a suitable packing may be provided at the opening 31 to prevent leakage, or permit only slight leakage, of fluid under pressure along the stem 29 through the opening 31. The usual push rod contained in the hollow stem 29 and so associated therewith as to operate the brake shoes through suitable brake rigging or lever mechanism is omitted for simplicity. A release spring 32 is interposed between one face of the piston and the end cover 30 and yieldingly urges the piston 27 in the left-hand direction, as viewed in the drawing.

When fluid under pressure is supplied through a pipe 34, to a chamber 33 formed between the piston 27 and the end cover 26 under the control of the relay valve device 14, the piston 27 is shifted in the right-hand direction against the resisting force of spring 32 and the push rod in stem 29 is thus correspondingly moved to shift the brake shoes into frictional engagement with the rim of the vehicle wheels or corresponding brake surface on the wheels to effect application of the brakes. When fluid under pressure is released from the chamber 33, the release spring 32 shifts the piston 27 and stem 29 correspondingly in the left-hand direction to effect disengagement of the brake shoes from the braking surface on the vehicle wheels.

As will be described in detail hereinafter, fluid under pressure is supplied to a chamber 35 formed between the piston 27 and the cover 30 and corresponding to the usual non-pressure side of a brake cylinder piston, through a pipe 36 under the control of the relay valve device 14a to assist in shifting the brake cylinder piston 27 in the left-hand direction and thus assist in effecting rapid release of the brakes.

The relay valve devices 14 and 14a are identical and, as shown, are of the highly sensitive type of relay valve device shown, described and claimed in the copending application Serial No. 740,202 of Ellis E. Hewitt, filed August 17, 1934, and assigned to the assignee of the present application. In view of the fact that the relay valve devices 14 and 14a are identical, only the relay valve device 14 is shown in section. Furthermore, in view of the complete description of the type of relay valve device corresponding to the relay valve devices 14 and 14a given in the copending application just mentioned, only a brief description of the construction and the operation of the relay valve device 14 will be given herein.

The relay valve device 14 comprises a main supply valve 37, a pilot supply valve 38, a main release valve 39, a pilot release valve 40, a piston 41 having a stem 42 which carries pivotally thereon a lever 43 adapted to effect operation of the main and pilot supply and release valves to control the pressure in a chamber 46, hereinafter called the pressure chamber. The main supply valve 37 is in the form of a valve piston and is normally biased to a seated position by a spring 44, the pilot supply valve 38 being of the poppet type and normally biased into seated relation on an associated valve seat formed at the back of the main supply valve 37 by a coil spring 45 disposed concentrically within the coil spring 44. The main release valve 39 is normally unseated from an associated valve seat to establish an exhaust communication from the pressure chamber 46 to atmosphere through an exhaust port 47.

The piston 41 has at one side thereof a chamber 48, hereinafter called the piston chamber, to which the control pipe 22 is connected, and, at the opposite side, a chamber 49. The chamber 49 and the chamber 46 are separated by an intervening wall 51 which has a central opening 52 therein through which the stem 42 of piston 41 extends, a piston 53 being formed on the stem 42 to guide the stem 42 in the opening 52. The piston 53 has a port 54 therein through which fluid under pressure may flow between the chambers 46 and 49 only at a restricted rate in order to prevent unduly rapid changes of pressure in the chamber 49 due to the operation of the main supply valve 37 and the main release valve 39.

In operation, an increase in fluid pressure in the piston chamber 48 shifts the piston 41 in the right-hand direction and, through the pivoted lever 43 carried on the piston stem 42 causes the main release valve 39 to be seated and then the main supply valve 37 to be unseated, successively. When the main supply valve 37 is unseated, fluid under pressure is supplied from the main reservoir supply pipe 23 to the pressure chamber 46 and the connected chamber 33 of the brake cylinder 11, the main supply valve 37 being reseated to cut off the further supply of fluid under pressure when the pressure in the chamber 46 and the connected chamber 49 at the right of the piston 41 attains a pressure substantially equal to the established pressure in the piston chamber 48.

Upon a further increase in pressure in the piston chamber 48, the main supply valve 37 is again unseated and reseated to cause an increase in the pressure within the pressure chamber 46 and brake cylinder chamber 33 corresponding to the amount of pressure increase in the piston chamber 48.

When the pressure in the piston chamber 48 is reduced from an established pressure, the main release valve 39 is unseated to exhaust fluid under pressure from the pressure chamber 46 and the connected brake cylinder 33 until the pressure therein corresponds substantially to the reduced pressure in the piston chamber 48, whereupon it is reseated to cut off the further exhaust of fluid under pressure. When the pressure in piston chamber 48 is reduced to atmospheric pressure, the main release valve 39 remains unseated and thus fluid under pressure is released from pressure chamber 46 and brake cylinder chamber 33 to completely release the brakes.

It will thus be apparent that the pressure established in the pressure chamber 46 of relay valve device 14 and in the brake cylinder chamber 33 corresponds at all times to the pressure established in the piston chamber 48.

In connection with the relay valve device 14a, it will be observed that the pressure chamber thereof, corresponding to pressure chamber 46, is constantly connected to the chamber 35 of the brake cylinder 11 through the pipe 36 and that the main supply valve thereof, corresponding to main supply valve 37, controls the supply of fluid under pressure from the supply reservoir 15 through a pipe 56 to the pressure chamber of the relay valve device 14a and to the brake cylinder chamber 35. The supply reservoir 15 is of large capacity for a reason which will be explained hereinafter and is charged from the main reservoir pipe 23 through a pipe 57 containing a check or one-way valve 58 for preventing back flow of fluid under pressure from the supply reservoir 15, the branch pipe 57 opening into another pipe 59 leading to the supply reservoir 15.

The magnet valve device 16 controls the supply of fluid under pressure through pipe 22 to the piston chamber 48 of relay valve device 14 and also the release of fluid under pressure from the piston chamber 48. The magnet valve device 16 comprises a casing having a chamber 68 in which is contained a double beat valve 65 that is operated by an electromagnet 66 through the medium of a plunger or stem 67. The chamber 68 is connected by one part of the pipe 22 to the piston chamber 48 of the relay valve device 14. When the electromagnet 66 is deenergized, the valve 65 is shifted to an upper seated position by a spring 69 to establish communication past the open lower seat thereof between the chamber 68 and a chamber 71 which is connected by the other portion of the pipe 22 to the brake valve device 13. It will thus be seen that as long as the electromagnet 66 of the magnet valve device 16 is deenergized, fluid under pressure may be supplied to the piston chamber 48 of the relay valve device 14 through the pipe 22 and released from the piston chamber 48 through the pipe 22 under the control of the brake valve device 13.

When the electromagnet 66 of the magnet valve device 16 is energized, plunger 67 is actuated to shift the valve 65 away from its upper seated position and into engagement with a lower associated valve seat, thus simultaneously cutting off communication between the chamber 68 and the chamber 71 and opening communication between the chamber 68 and a chamber 73 which is constantly open to atmosphere through an exhaust port 74. It will thus be apparent that when the electromagnet 66 is energized, the supply of fluid under pressure through the pipe 22 to the piston chamber 48 of the relay valve device 14 is cut off and fluid under pressure released rapidly to atmosphere from the piston chamber 48 through the exhaust port 74 of the magnet valve device 16.

The magnet valve device 17 comprises a pair of oppositely seating valves 76 and 77, hereinafter called the supply valve and the release valve, respectively, and an electromagnet 78 for operating the valves 76 and 77 through the medium of the plunger or stem 79. The supply valve 76 is contained in a chamber 81 which is connected by the pipe 59 to the supply reservoir 15, and the release valve 77 is contained in a chamber 82 which is constantly open to atmosphere through an exhaust port 83. Interposed between the chambers 81 and 82 is a chamber 84 which is constantly connected through a pipe 85 with the piston chamber of the relay valve device 14a corresponding to piston chamber 48 of relay valve device 14. The valves 76 and 77 are provided with fluted stems which meet in end-to-end contact within the chamber 84 and a coil spring 86, acting on the supply valve 76, simultaneously seats the supply valve 76 and unseats the release valve 77 as long as the electromagnet 78 is deenergized. When the electromagnet 78 is energized the plunger 79 is actuated to simultaneously shift the supply valve 76 and the release valve 77 to unseated and seated positions, respectively, against the resistance of the spring 86.

With the release valve 77 unseated, communication is established from the chamber 84 and the connected piston chamber of the relay valve device 14a to the atmosphere by way of the chamber 82 and exhaust port 83. With the supply valve 76 unseated, communication is established between the chambers 81 and 84, so that fluid under pressure is supplied from the supply reservoir 15 to the piston chamber of the relay valve device 14a.

The wheel-slip detector 18 corresponds to the type shown, for example, in Patent 2,038,145 to Earl S. Cooke and Charles F. Hammer, although any other suitable type of device may be provided if desired. The wheel-slip detector 18 may comprise a toggle switch 91, controlling the circuit for energizing the electromagnets of the magnet valve devices 16 and 17, a centrifuge device 92 for actuating the toggle switch 91, and a differential gear mechanism 93, similar in construction to the conventional differential gear mechanisms of automotive vehicles, for causing rotation of the centrifuge device 92.

The differential gear mechanism 93 registers the difference in speed of rotation of a tracer wheel 94 rolling at rail or vehicle speed along the road surface or rail and the rotative speed of another tracer wheel 95 which frictionally engages the rim of a vehicle wheel 96 and which rotates according to the rotative speed of the vehicle wheel. As will be seen in the drawing, the oppositely facing bevel gears 97 and 98 of the differential gear mechanism are simultaneously rotated in opposite directions by tracer wheels 94 and 95, respectively, as through rods or shafts and cooperating bevel gears 100. Thus, as long as the vehicle wheel 97 rotates at a speed corresponding to the speed of the vehicle, that is, rail speed, the ring gear 99 of the differential gear mechanism is stationary because the two bevel gears 97 and 98 rotate at the same speed in opposite directions. When the tracer wheel 95 rotates more slowly than the tracer wheel 94, as is the case when the vehicle wheel 96 slips, then the ring gear 99 rotates at a speed corresponding to the difference of speeds of the tracer wheels 94 and 95.

The centrifuge device 92, which is of such familiar construction as to obviate the necessity for description, is rotated by rotation of the ring gear 99 of differential gear mechanism 93, the ring gear 99 meshing with a bevel pinion gear 101 secured to a shaft 102 carrying the centrifuge device 92. Thus, upon the rotation of the ring gear 99 of the differential gear mechanism 93 which occurs whenever the vehicle wheel 96 slips and the tracer wheel 95 accordingly rotates at a slower speed than the tracer wheel 94, the centrifugal force urging the flyballs 103 of the centrifuge device 92 outwardly causes upward movement of a stem 104 against the resistance of a yielding spring 105.

Upon a sufficient decrease in speed of the tracer wheel 95 relative to the speed of the tracer wheel 94 and a corresponding upward movement of the stem 104, the spring 106 of the toggle switch 91 snaps the toggle levers 107 past their dead center position and, in the opposite direction, into circuit-closing engagement with a pair of spaced insulated contact members 108.

As will be evident in the drawing, a battery 111 is effective, when the toggle switch 91 is actuated to circuit-closing position to supply current over the simple circuit indicated, to cause simultaneous energization of the electromagnets 66 and 78 of the magnet valve devices 16 and 17, respectively.

It will be apparent that the speed ratio between the ring gear 99 of the differential gear mechanism 93 and the bevel pinion gear 101 may be suitably selected so that for a differtial speed of but a few revolutions per minute between the tracer wheel 94 and the tracer wheel 95, the centrifuge 92 may be rotated sufficiently rapidly to cause actuation of the toggle switch 91 from its normal circuit-opening position, shown, to its circuit-closing position. Thus, upon the initiation of slipping of vehicle wheel 96 due to the application of the brakes thereon, the electromagnets of the magnet valve devices 16 and 17 will be substantially immediately energized.

*Operation of equipment*

In operation, let it be assumed that the vehicle or train is traveling along the road with the main reservoir 12 and the supply reservoir 15 charged to normal pressure and with the brake valve handle 21 in brake release position. Since magnet valve device 16 is deenergized, the piston chamber 48 of the relay valve device 14 is accordingly vented to atmosphere at the brake valve 13 and consequently relay valve device 14 is conditioned so that the brake cylinder chamber 33 is vented to atmosphere. At the same time, since the magnet valve device 17 is deenergized, the piston chamber of the relay valve device 14a is vented to atmosphere and consequently the relay valve device 14a is conditioned so as to vent the chamber 35 of the brake cylinder to atmosphere. The release spring 32 of the brake cylinder 11 thus maintains the piston 27 in the left-hand position shown, wherein the brakes are released from the vehicle wheel 96.

If it is desired to effect an application of the brakes with the equipment conditioned as above described, the operator shifts the brake handle 21 out of release position to, for example, service application position and when a sufficient pressure has been established in the piston chamber 48 of the relay valve device 14 corresponding to a desired degree of braking, shifts the handle to lap position to maintain such pressure in the piston chamber 48. The relay valve device 14 then operates, in the manner previously described, to supply fluid to the brake cylinder chamber 33 to establish therein a pressure corresponding to the pressure established in the piston chamber 48. The brake cylinder piston 27 is thus correspondingly shifted in the right-hand direction to cause movement of the brake shoes into frictional engagement with the vehicle wheels whereby application of the brakes is effected.

If it is desired to effect an emergency application of the brakes, either initially or following a service application of the brakes, the brake valve handle 21 is shifted to emergency position and allowed to remain there so that the maximum pressure will be established in the piston chamber 48 of the relay valve device 14 and a corresponding maximum pressure established in the brake cylinder chamber 33.

If it is desired to release the brakes, the operator merely returns the brake valve handle 21 to release position to reduce the pressure in the piston chamber 48 of the relay valve device 14 to atmospheric pressure, the relay valve device 14 then operating to correspondingly reduce the pressure in the brake cylinder chamber 33 to atmospheric pressure to effect the complete release of the brakes.

Let it now be assumed that, upon an application of the brakes, the vehicle wheel 96 begins to slip. Immediately wheel-slip detector 18 responds and effects closing of the circuits for energizing the magnet valve devices 16 and 17. The magnet valve device 16 closes off the supply of fluid under pressure through the pipe 22 from the brake valve device 13 to piston chamber 48 of the relay valve device 14 and independently releases fluid under pressure from the piston chamber 48. The relay valve device 14 is an extremely sensitive relay device and functions without delay, upon the energization of the magnet valve device 16, to rapidly reduce the pressure in the brake cylinder chamber 33.

Due to the frictional resistance to movement of the levers or rods of the brake rigging, whereby the movement of the brake cylinder piston is transmitted to effect movement of the brake shoes into brake applying engagement with the rim of the vehicle wheels and release therefrom, and due to possible sticking of the brake shoes to the rim of the wheels, a considerable reduction in the pressure within a brake cylinder is ordinarily required in order to release the brake sufficiently to permit the vehicle wheels to again accelerate back toward a speed corresponding to vehicle speed. In other words, the release spring 32, acting alone, is ineffective to release the brakes rapidly against the reducing pressure in the brake cylinder chamber 33 to cause the vehicle wheel to stop deceleration in slipping and begin acceleration back to a speed corresponding to vehicle speed.

As previously indicated, however, according to my present invention, the magnet valve device 17 is energized simultaneously with the magnet valve device 16 upon the initiation of the slipping of the vehicle wheel 96 and, thus, simultaneously with the reduction of the pressure in the brake cylinder 33, the relay valve device 14a is operated to cause fluid under pressure to be supplied rapidly from the supply reservoir 15 to the chamber 35 of the brake cylinder on the usual non-pressure side of the brake cylinder piston 27.

It should now be apparent that, with the pressure in the brake cylinder chamber 33 being rapidly reduced and the pressure in the brake cylinder chamber 35 being rapidly increased, the pressure in the two chambers 33 and 35 on opposite sides of the brake cylinder piston 27 will equalize in a relatively short interval of time well within the slipping interval or period of the vehicle wheel. Therefore, the release spring 32 becomes positively effective to shift piston 27 and cause the brake shoes to rapidly disengage the vehicle wheels and effect such complete release of the brakes that the slipping vehicle wheels commence to accelerate back to a speed corresponding to vehicle speed without having attained a locked-wheel state. The supply reservoir 15 is of large capacity in order to obtain high pressures in brake cylinder chamber 35 and thus, notwithstanding high fluid pressure in brake cylinder chamber 33, rapidly equalize with the pressure in chamber 33 to more effectively and rapidly cause release of the brakes. The high pressure obtainable in brake cylinder chamber 35 also insures disengagement of the brake shoes notwithstanding brake rigging friction or sticking of the brake shoes to the wheel.

Thus, by preventing a vehicle wheel, which begins to slip, from attaining a locked-wheel state and insuring that it continues to roll notwithstanding that it may roll at a speed different from vehicle speed, the possibility of the development of flat spots on the wheel and the consequent maintenance or repair expense is reduced.

When the brakes are released from a slipping wheel, and the wheel accordingly accelerates back toward a speed corresponding to vehicle speed, the wheel-slip detector 18 operates to interrupt the circuit for energizing the magnet valve devices 16 and 17. The return of the magnet valve device 16 to its normal position, shown in the drawing, establishes communication through the pipe 22 whereby the pressure in the piston chamber 48 of the relay valve device 14 may be restored. It may be assumed for present purposes that the portion of the supply pipe 22 between the brake valve 13 and the magnet valve 16 has a sufficient capacity that upon the deenergization of the magnet valve device 16, a substantial pressure is restored automatically in the piston chamber 48 of the relay valve device 14, which pressure is, however, lower than the original pressure established in the piston chamber 48. In order to provide a desired capacity for the portion of pipe 22 between the brake valve 13 and the magnet valve 16, a volume reservoir, not shown, may be connected thereto.

The deenergization of the electromagnet 78 of the magnet valve device 17 upon the return of the slipping vehicle wheel to a speed corresponding substantially to vehicle speed, following slipping thereof, causes fluid under pressure to be vented from the piston chamber of the relay valve device 14a to atmosphere past the unseated release valve 77 of the magnet valve device 17 and through the exhaust port 83. The relay valve device 14a thus operates to release fluid under pressure from the chamber 35 of the brake cylinder 11.

It will thus be seen that, when the wheel 96 returns substantially to a speed corresponding to vehicle speed following slipping thereof, the brakes are automatically reapplied. Furthermore, in view of the fact that the pressure automatically restored in the chamber 33 of the brake cylinder 11 by deenergization of the magnet valve device 16 is lower than the original pressure which initiated the slipping of the wheel 96, it is not likely that the wheel 96 will again begin to slip unless the coefficient of adhesion between the wheel and the road surface or rail has, in the meantime, become lower or unless the vehicle or train so reduces in speed that the increase in the coefficient of friction between the brake shoes and the rim of the wheel 96 and the consequent increase in the retarding force thereon, for a given pressure in the brake cylinder 23, increases to a sufficient extent to cause the wheel 96 to again slip.

When the vehicle or train comes to a complete stop due to the brake application, it will be apparent that the toggle switch 91 of the wheel-slip detector 18 is automatically returned, in any case, to the circuit-opening position thereof and, thus, the magnet valve devices 16 and 17 are deenergized so that fluid under pressure may be supplied to the brake cylinder chamber 33 under the control of the brake valve handle 21 to any desired degree sufficient to hold the vehicle or train against creepage on a grade. In other words, with the magnet valve device 16 in its normal position shown, the brakes may be applied and released, at will, in the manner previously described.

While I have illustrated an equipment including only one brake cylinder, it will be apparent that my invention contemplates an equipment for a train of cars including a plurality of brake cylinders for applying the brakes on different wheels or the wheels on different wheel-trucks. Furthermore, it will be seen that while I have disclosed a simple arrangement whereby the pressure in the piston chambers of the relay valve devices 14 and 14a for each brake cylinder are controlled, it will be apparent that my invention contemplates any suitable arrangement for controlling the operation of the relay valve devices 14 and 14a to effect the result described.

*Summary*

Summarizing, it will be seen that I have provided a vehicle brake control equipment including a wheel-slip detector and highly sensitive fluid-pressure-responsive relay devices operated upon the initiation of slipping of a wheel to simultaneously and rapidly reduce the pressure of the fluid on the usual pressure side of the brake cylinder piston and increase the pressure on the usual non-pressure side thereof. By thus rapidly equalizing the fluid pressure on opposite sides of the brake cylinder piston, the release spring is rendered effective to rapidly shift the piston to cause disengagement of the brake shoes from the slipping wheel and thus enable the vehicle wheel to cease deceleration of slip and accelerate back toward a speed corresponding to a vehicle speed within the slipping interval without attaining zero speed, that is, without attaining the locked-wheel state. Further, the ultimate preponderance of fluid pressure on the non-pressure side of the brake cylinder piston insures a more prompt release in cases where high friction is present in the brake rigging.

While I have disclosed a specific embodiment of my invention, it will be apparent that various omissions, additions or modifications may be made in the embodiment shown without departing from the spirit of my invention. It is not my intention, therefore, to limit the scope of my invention except as it is necessitated by the scope of the prior art.

Having now described my invention, what I claim as new and desire to secure by Letters Patent, is:

1. A vehicle brake system comprising a brake cylinder having a piston therein normally urged to a position to effect release of the brakes, means for effecting the supply of fluid under pressure to and the release of fluid under pressure from one side of said piston to cause movement of the piston to effect application and release of the brakes, and means effective automatically when a vehicle slips for causing fluid under pressure to be simultaneously released from the said one side of the piston and supplied to the opposite side thereof to cause release of the brakes.

2. A vehicle brake system comprising a brake cylinder having a piston therein normally urged to a position to effect release of the brakes, means for effecting the supply of fluid under pressure to and the release of fluid under pressure from one side of said piston to cause movement of the piston to effect application and release of the brakes, means responsive to the slipping of a vehicle wheel, and means controlled by the wheel-slip responsive means for causing fluid under pressure to be released from said one side of the piston and simultaneously supplied to the opposite side thereof to effect release of the brakes.

3. A vehicle brake system comprising a brake cylinder having a piston therein normally urged to a position for effecting release of the brakes, means for effecting the supply of fluid under pressure to and the release of fluid under pressure from one side of said piston to cause said piston to move to effect application and release of the brakes, respectively, and means effective when a vehicle wheel slips in excess of a predetermined low degree below a rotative speed corresponding to vehicle speed for effecting, simultaneously, the release of fluid under pressure from the said one side of the piston and the supply of fluid under pressure to the opposite side of the piston, to cause release of the brakes sufficiently rapidly that the vehicle wheel accelerates back toward a rotative speed corresponding to vehicle speed before attaining a locked-wheel state.

4. A vehicle brake system comprising a brake cylinder having a piston therein normally urged to a position for effecting release of the brakes, means for effecting the supply of fluid under pressure to and the release of fluid under pressure from one side of the piston to cause movement of the piston to effect application and release of the brakes, respectively, and means responsive automatically when a vehicle wheel slips in excess of a certain uniform low degree below a rotative speed corresponding to vehicle speed for effecting, simultaneously, the release of fluid under pressure from the said one side of the piston and the supply of fluid under pressure to the opposite side of said piston to effect release of the brakes whereby the slipping wheel may accelerate back toward a speed corresponding to vehicle speed, the wheel-slip responsive means being effective automatically when the vehicle wheel slips less than the certain uniform degree for causing fluid under pressure to be resupplied to the said one side of the piston and fluid under pressure to be released from the opposite side of said piston whereby to cause the piston to move to effect reapplication of the brakes.

5. A vehicle brake system comprising a brake cylinder having a piston therein normally urged to a position for effecting release of the brakes, a first normally charged reservoir, a second normally charged reservoir, means operative to cause fluid under pressure to be supplied from said first reservoir to one side of the piston to shift the piston to effect application of the brakes and to cause fluid under pressure to be released from said one side of the piston to cause the piston to be moved to effect release of the brakes, and means effective automatically when a vehicle wheel slips for causing fluid under pressure to be released from the said one side of the piston independently of the first said means and for causing fluid under pressure to be supplied from said second reservoir to the opposite side of the piston whereby to cause the piston to be rapidly shifted to the position for effecting release of the brakes.

6. A vehicle brake system comprising a brake cylinder having a piston therein normally yieldingly urged to a position for effecting release of the vehicle brakes on a vehicle wheel and shifted out of the normal position in response to an increase in pressure on one side thereof to effect application of the brakes, manually operable means for controlling the pressure on the said one side of the brake cylinder piston, means effective when the vehicle wheel slips for rendering the manually operable means ineffective to control the pressure on the said one side of the brake cylinder piston and for effecting a reduction of the pressure on said one side of the brake cylinder piston, and means effective when the vehicle wheel slips for causing an increase in the pressure on the side of the brake cylinder piston opposite said one side, the pressure on opposite sides of the brake cylinder piston being thereby rapidly equalized and the brakes accordingly released.

7. A vehicle brake system comprising a brake cylinder having a piston normally in a position to effect release of the brakes on a vehicle wheel and shiftable out of said normal position upon the supply of fluid under pressure to one side thereof to effect application of the brakes on the vehicle wheel, manually operable means for controlling the pressure on said one side of the brake cylinder piston to control the application and the release of the brakes, means responsive to slipping of the vehicle wheel, means controlled by the wheel-slip responsive means for rendering said manually operable means ineffective to control the pressure on said one side of the brake cylinder piston and for effecting a reduction of the pressure on the said one side of the brake cylinder piston when the vehicle wheel slips, and means controlled by the wheel-slip responsive means for effecting an increase of pressure on the side of the brake cylinder piston opposite said one side to a pressure in excess of the reduced pressure on the said one side whereby the pressure of the fluid on the opposite side of the brake cylinder piston is effective to shift the brake cylinder piston to its normal position.

8. A vehicle brake system comprising a brake cylinder having a piston which is normally in a position to effect release of the brakes on a vehicle wheel and which is shiftable out of said normal position upon an increase in pressure on one side thereof to effect application of the brakes, manually operable means for establishing a desired pressure on the said one side of the brake cylinder piston to effect a desired degree of application of the brakes, and means effective when the vehicle wheel slips in excess of a certain degree below a speed corresponding to vehicle speed for rendering the manually operable means ineffective to control the pressure on the said one side of the brake cylinder piston and for causing fluid under pressure to be exhausted from the said one side of the brake cylinder piston, and means effective when the vehicle wheel slips in excess of said certain degree for effecting an increase of pressure on the side of the brake cylinder opposite said one side whereby the said piston is shifted to its normal position to effect release of the brakes on the vehicle wheel.

ELLERY R. FITCH.

CERTIFICATE OF CORRECTION.

Patent No. 2,132,914. October 11, 1938.

ELLERY R. FITCH.

It is hereby certified that error appears in the printed specification of the above numbered patent requiring correction as follows: Page 6, first column, line 17, claim 1, after the word "vehicle" insert wheel; and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.

sired pressure on the said one side of the brake cylinder piston to effect a desired degree of application of the brakes, and means effective when the vehicle wheel slips in excess of a certain degree below a speed corresponding to vehicle speed for rendering the manually operable means ineffective to control the pressure on the said one side of the brake cylinder piston and for causing fluid under pressure to be exhausted from the said one side of the brake cylinder piston, and means effective when the vehicle wheel slips in excess of said certain degree for effecting an increase of pressure on the side of the brake cylinder opposite said one side whereby the said piston is shifted to its normal position to effect release of the brakes on the vehicle wheel.

ELLERY R. FITCH.

CERTIFICATE OF CORRECTION.

Patent No. 2,132,914. October 11, 1938.

ELLERY R. FITCH.

It is hereby certified that error appears in the printed specification of the above numbered patent requiring correction as follows: Page 6, first column, line 17, claim 1, after the word "vehicle" insert wheel; and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.